United States Patent

Woodhouse et al.

[15] 3,689,138
[45] Sept. 5, 1972

[54] MOTION PICTURE PROJECTION APPARATUS

[72] Inventors: Fred N. Woodhouse, Rochester; Craig E. Smith, York, both of N.Y.

[73] Assignee: Eastman Kodak Company, Rochester, N.Y.

[22] Filed: March 10, 1971

[21] Appl. No.: 122,849

[52] U.S. Cl. ............... 352/92, 200/61.14, 226/12, 226/91, 352/174
[51] Int. Cl. .......................................... G03b 21/50
[58] Field of Search......352/124, 155, 174, 176, 158, 352/92; 226/12, 35, 44, 45, 56, 91, 92; 200/61.13, 61.14

[56] References Cited

UNITED STATES PATENTS

| | | | |
|---|---|---|---|
| 3,134,294 | 5/1964 | Kaden | 226/45 X |
| 3,432,228 | 3/1969 | Hellmund | 352/92 X |
| 3,561,854 | 2/1971 | Bundschuh | 352/92 X |
| 3,429,518 | 2/1969 | McKee | 352/158 X |
| 3,303,981 | 2/1967 | Wiese | 226/56 |
| 3,240,550 | 3/1966 | Mitchell | 226/45 X |
| 3,578,852 | 5/1971 | Aldridge | 352/92 |

*Primary Examiner*—Samuel S. Matthews
*Assistant Examiner*—Monroe H. Hayes
*Attorney*—W. H. J. Kline and Milton S. Sales

[57] ABSTRACT

A motion picture projector includes a housing, a movable pressure pad on the housing biased toward an aperture plate to define a film channel therebetween for receiving a strip of film. An edge guide is mounted on the housing for movement from a position adjacent one edge of a received strip of film to a position spaced from said strip of film, and a film advancing member is mounted on the housing for movement into and along the film channel so as to intermittently advance a received strip of film along the channel. An actuator is rotatably mounted on the housing and is connected to the pressure pad and the edge guide so that rotation of the actuator in one direction opens the film channel by moving the pressure pad away from the aperture plate and moving the edge guide to its position spaced from the film strip. Cam means are provided for moving the actuator along its axis of rotation upon rotation of the actuator in a channel-opening direction, the actuator being interconnected to the film advancing member to block movement of the film advancing member into the film channel upon such axial movement of the actuator. A film detecting member is mounted on the housing for movement between a first position in which a portion of the detecting member extends into the path of a strip of film in the region of the channel and a second position in which that portion of the detecting member is spaced from the film path. The detecting member is connected to the actuator whereby rotation of the actuator in a channel opening direction moves the member to its second position.

3 Claims, 4 Drawing Figures

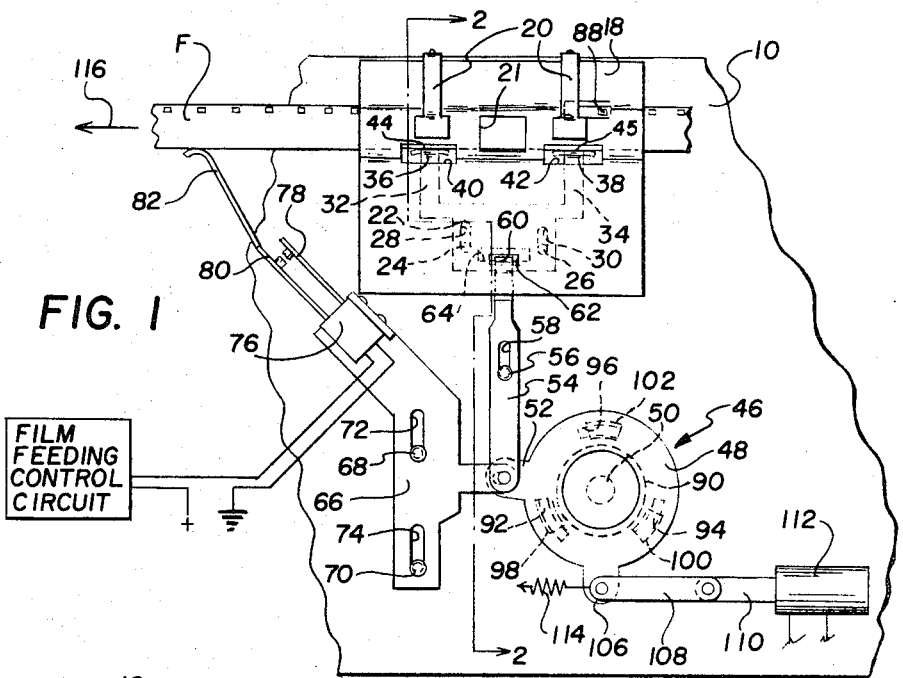
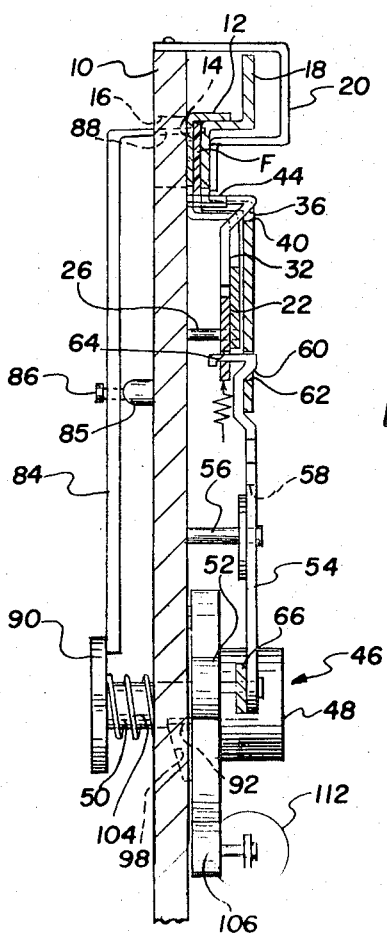
FIG. 1
FIG. 2
FRED N. WOODHOUSE
CRAIG E. SMITH
INVENTOR.
BY Milton S. Sales
W. H. J. Kline
ATTORNEYS

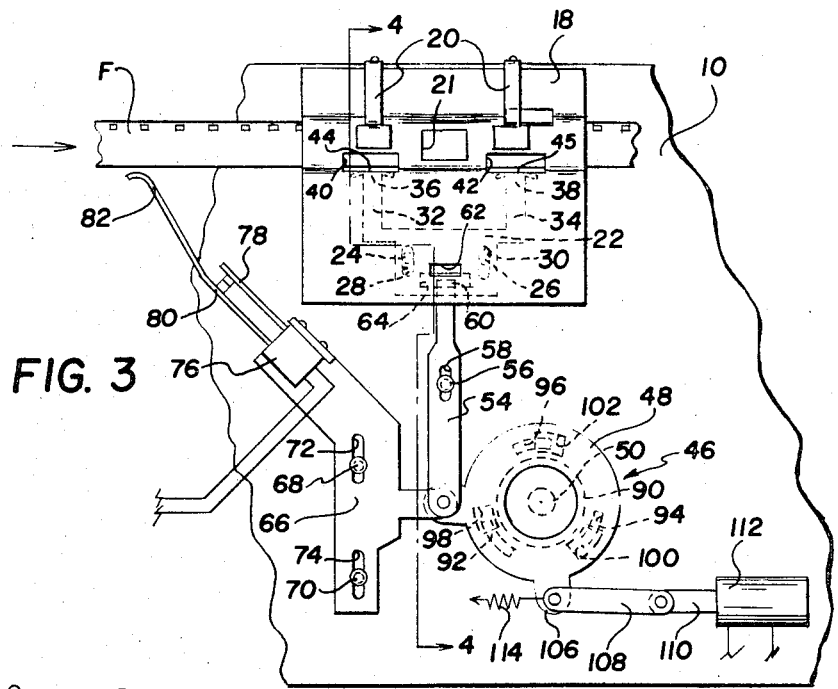
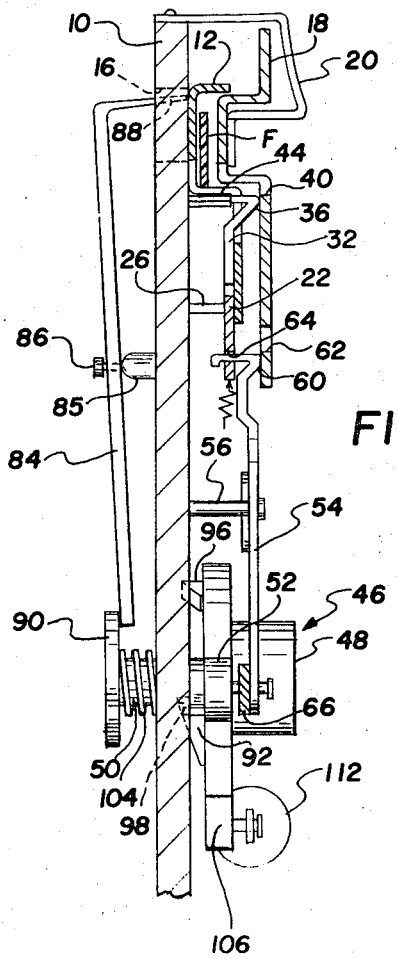
FIG. 3
FIG. 4
FRED N. WOODHOUSE
CRAIG E. SMITH
INVENTOR.

MOTION PICTURE PROJECTION APPARATUS

BACKGROUND OF THE INVENTION

1. Field of the Invention

The present invention relates to motion picture projectors, and more particularly to a mechanism for opening the film projection gate of a motion picture projector.

2. Description of the Prior Art

It is customary in some motion picture projectors to provide a mechanism for opening the projection gate during various operational modes of the projector. In some projectors, the gate is opened during the film threading mode, such as for example is shown in U.S. Pat. No. 1,954,808 in the names of W. D. Foster et al. and in British Pat. No. 475,594 to C. J. P. Small et al. In other projectors, the projection gate is normally closed while the film is being threaded, and may be opened during high speed film sluing such as occurs during rewind and review modes of operation. Apparatus in accordance with the latter type of projector is shown in coassigned U.S. Pat. No. 3,468,498 in the name of L. J. Bunting. Regardless of the purpose for opening the film gate, apparatus is normally provided for moving the projection gate pressure pad away from the aperture plate and for preventing the pull-down claw, if present, from entering the film path while the gate is open. Further examples of projectors having gate opening mechanism are disclosed in U.S. Pat. No. 1,944,035 in the name of B. A. Proctor, U.S. Pat. No. 2,493,440 in the name of K. Brenkert and German Pat. No. 1,957,451. Examples of mechanism for withdrawing the pull-down claw from the film gate are provided in some of the above-identified patents and in U.S. Pat. No. 3,063,651 in the names of H. Becker et al.

In projectors having means for automatically withdrawing the leading end of a filmstrip from a supply roll and for feeding the filmstrip through the projection gate, it is customary to provide a switch having a member extending into the path of the filmstrip for detecting the presence of film at the projection gate. Upon detection of the presence of film by the switch, the mechanism for withdrawing the film from the roll is retracted so as not to interfere with further film feeding. Such a projector is shown in coassigned U.S. Pat. No. 3,429,518 in the name of E. S. McKee.

SUMMARY OF THE INVENTION

Objects of the present invention include the provision in a motion picture projector of an uncomplicated, compact mechanism for withdrawing the pressure pad from the aperture plate of a projection gate, for moving the film edge guide away from the film path, for blocking entry of the pull-down claw into the film path while the gate is opened and for removing a film presence detection member from the film path while the gate is opened.

In accordance with the above objects, a motion picture projector having a housing, a movable pressure pad on the housing biased toward an aperture plate, and a film advancing member mounted on the housing for movement into and along a film channel defined between the pressure pad and the aperture plate so as to intermittently advance a strip of film along the channel includes an actuator mounted on the housing with at least two degrees of freedom for simultaneous movement in first and second directions. The actuator is connected to the pressure pad and the film advancing member so that movement of the actuator in the first direction effects movement of the pressure pad away from the aperture plate and movement of the actuator in the second direction prevents movement of the film advancing member into the film channel when the gate is opened.

In accordance with another feature of the present invention, a motion picture projector having a housing, a movable pressure pad on the housing biased towards an aperture plate to define a film channel therebetween and an edge guide movably mounted on the housing from a position adjacent one edge of a received strip of film to a position spaced from the film includes an actuator movably mounted on the housing and means interconnecting the actuator and the pressure pad whereby movement of the actuator in a first direction effects movement of the pressure pad away from the aperture plate and movement of the actuator in a second direction effects movement of the pressure pad toward the aperture plate. The actuator is connected to the edge guide such that movement of the actuator in its first direction effects movement of the edge guide away from the edge of a received strip of film and movement of the actuator in its second direction effects movement of the edge guide toward the edge of a received strip of film.

In accordance with yet another feature of the present invention, a motion picture projector having a housing and a movable pressure pad on the housing biased toward an aperture plate to define a film channel therebetween includes means actuatable for moving the pressure pad away from the aperture plate whereby the film channel has a dimension transverse to a received strip of film larger than the thickness of the film. Means are provided for detecting the presence of a strip of film in the region of the film channel, the detecting means being movable to a position spaced from the film path when the pressure pad is moved away from the aperture plate.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which:

FIG. 1 is a partial view of a motion picture projector showing a projection gate and means for opening the gate in accordance with the present invention;

FIG. 2 is a sectional view taken along line 2—2 of FIG. 1;

FIG. 3 is a view similar to FIG. 1 showing the parts in another position; and

FIG. 4 is a sectional view taken along line 4—4 of FIG. 3.

DESCRIPTION OF THE PREFERRED EMBODIMENT

Because motion picture projectors are well known, the present description will be directed in particular to elements forming part of, or cooperating more directly with, apparatus in accordance with the present invention. It is to be understood that projector elements not specifically shown or described may take various forms well known to those skilled in the art.

Referring to FIGS. 1 and 2, the apparatus is shown in position wherein the film projection gate, to be described in detail hereinafter, is closed and the projector is in a mode for projecting the image on the film received in the gate. The projector includes a housing of which a portion is illustrated as a plate 10 which carries an aperture plate 12 having an opening 14 overlying an opening 16 in plate 10. Aperture plate 12 has a U-shaped configuration in the region of opening 14 to receive a mating portion of a pressure pad 18 which is biased toward the aperture plate by a pair of spring clips 20. Each clip has its top portion attached to plate 10 and its lower portion bears against pad 18. Pressure pad 18 has an opening 21 aligned with openings 14 and 16 in aperture plate 12 and housing plate 10, respectively. Aperture plate 12 and pressure pad 18 are bent downwardly, that direction taken in the sense as shown in the accompanying drawings, and terminate below the film gate region.

The film edge guide member 22 is carried between housing plate 10 and the lower, bent portion of aperture plate 12 for vertical movement by a pair of pins 24 and 26 which extend through a pair of slots 28 and 30, respectively, in edge guide member 22. Pins 24 and 26 also function as support pedestals for aperture plate 12 on housing plate 10. Edge guide member 22 has a pair of projecting arms 32 and 34 which extend toward the film channel. The end portions of arms 32 and 34 are bent, FIG. 2, to form ramp surfaces 36 and 38 projecting through a pair of openings 40 and 42, respectively, in pressure pad 18. Flat surfaces 44 and 46 are provided on the ends of arms 32 and 34 to form an edge guide for the lower edge of film in the projection gate.

An actuator 46 includes a disc 48 carried on one end of a shaft 50 which projects through a circular opening in housing plate 10 for rotational and axial movement. Disc 48 has a radially extending tab 52 to which a link 54 is pivotally connected.

Link 54 is slidably mounted on housing plate 10 by a pin 56 which extends through a slot 58 in the link. The upper end portion of link 54 is bent to form a ramp surface 60, FIG. 2, which protrudes through an opening 62 in pressure pad 18. The free upper end of link 54 extends through an opening 64 in edge guide member 22.

Also connected to tab 52 is a slide member 66 which is carried by a pair of pins 68 and 70 on plate 10 and extending through slots 72 and 74, respectively. An electrical switch 76 having a pair of normally closed contacts 78 and 80 is carried on slide member 66. Contact 80 includes a member 82 adapted to extend into the path of filmstrip F for detecting the presence of film in the region of the film channel. Switch 76 controls operation of the projector film feeding mechanism, not shown, in the following manner. When a supply roll of film is placed on the projector and the film feeding mechanism is actuated, the film threading operation will continue until film has proceeded along the film path to the projection gate. At that point, the film is picked up by the projector pull-down claw and the film feeding mechanism is no longer needed. Switch 76 is provided for detecting the presence of film at the projection gate and for deactuating the film feeding mechanism. Details of apparatus of this type may be found in coassigned U.S. Pat. No. 3,429,518 in the name of E. S. McKee.

Referring to FIG. 2, a conventional film advancing member 84 is mounted on housing plate 10 by a stud 86 for rocking movement about a pivot 85 so that a pull-down claw 88 can enter the film channel through opening 16 in plate 10 and a second opening above opening 14 in aperture plate 12. Claw 88 is movable by means (not shown) along the film channel in a known manner to intermittently advance film. The bottom portion of film advancing member 84 is aligned with a disc 90 on shaft 50.

Three cam lobes 92, 94 and 96 project from the bottom of disc 48 into mating ramped recesses 98, 100 and 102, respectively in housing plate 10. A compression spring 104 between disc 90 and housing plate 10 urges actuator 46 to the left as viewed in FIG. 2.

A second tab 106 on disc 48 carries a link 108 which is pivotally connected to an armature 110 of a solenoid 112. When energized, solenoid 112 pulls against the force of a spring 114 to rotate actuator 46 in a counter-clockwise direction as viewed in FIG. 1.

OPERATION

In motion picture projectors having means for stripping and feeding film material from a supply roll such as shown in above-mentioned U.S. Pat. No. 3,429,518 in the name of E. S. McKee, a roll of film is mounted on the housing with a surface of the roll exposed for application of a driving means in direct contact with the surface of the roll. A film stripper device is adapted to engage the film roll and strip the film from the roll during rotation of the roll by the driving means and is disposed in such a manner with respect to the roll driving means as to form a guide channel for leading the end of the filmstrip material from the roll into a film threading channel which leads the film to the projection gate. During the period in which the film is being stripped from the roll, the projection gate and associated apparatus shown in the present application are arranged and positioned as shown in FIGS. 1 and 2, solenoid 112 being deenergized and the projection gate being closed. As filmstrip F enters the film gate in the direction of arrow 116, pressure pad 18 is moved by the film away from aperture plate 12 by a distance equal to the thickness of filmstrip F. As the filmstrip enters the gate, pull-down claw 88 of film advancing member 84 engages succeeding perforations in the film to advance the filmstrip along a film channel defined by aperture plate 12, pressure pad 18 and surfaces 44 and 46 of edge guide member 22.

As filmstrip F advances past the film gate, the leading edge of the film contacts member 82 to move switch contact 80 away from switch contact 78, thereby opening the circuit to the film feeding control mechanism. As explained in the McKee patent, the driving means and the film stripper device will be retracted from contact with the film roll when the control circuit is opened. At this time, film projection proceeds in a normal manner with the film being advanced through the gate by the pull-down claw.

Referring to FIGS. 3 and 4, when the entire roll of the film has been projected, or at any time when it is desired to rapidly rewind the film onto the supply roll through the film gate, it is desirable to open the film gate to reduce frictional drag on the film and to eliminate possible film damage. During such rewind periods, removal of member 82 of switch 74 from the film path is desirable for the same reason.

Solenoid 112 is energized simultaneously with the actuation of the rewind or review cycles of the projector to rotate actuator 46 in a counterclockwise direction against the force of spring 114. Such rotation pulls link 54 downwardly as viewed in the drawings, such downward movement effecting similar movement of edge guide member 22. Ramp surfaces 60 and 36 of link 54 and edge guide member 22 cam pressure plate 18 away from aperture plate 12 against the force of springs 20. The combined movement of edge guide surfaces 44 and 46 and pressure plate 18 away from film F opens the film gate in the manner shown in FIG. 4 to reduce pressure against both the edges and sides of film F.

Simultaneously with the opening of the film gate, cam lobes 92, 94 and 96 ride up ramped recesses 98, 100 and 102 to move actuator 46 to the right as viewed in FIG. 4 against the force of spring 104. Disc 90 on shaft 50 pushes against the lower end of film advancing member 84 to rotate that member in a counterclockwise direction about pivot 85, thereby blocking movement of pull-down claw 88 into the film channel.

Rotation of actuator 48 pulls slide member 66 downwardly, carrying member 82 of switch 76 therewith. This removes member 82 from the film path so as not to interfere with the rewinding of the film. Closure of contacts 78 and 80 does not effect operation of the projector since the film feeding mechanism is controlled by a separate switch, not shown, in series with switch 76.

When the projector is once again placed in a non-rewind state, solenoid 112 is deenergized to allow spring 114 to rotate actuator in a clockwise direction. Tab 52 raises link 54 and slide 66 to close the film gate and return switch member 82 to its FIG. 1 position in the film path. Spring 104 pushes against disc 90 to cause actuator 46 to move to the left as viewed in FIG. 2, thereby unblocking film advance member 84.

The invention as been described in detail with particular reference to a preferred embodiment thereof, but it will be understood that variations and modifications can be effected within the spirit and scope of the invention.

We claim:

1. In a motion picture projector having (1) a housing, (2) an aperture plate, (3) a pressure pad mounted on said housing for movement toward and away from the aperture plate to define a variable size film channel therebetween for receiving a strip of film, (4) biasing means for urging the pressure pad toward the aperture plate, and (5) means connected to the pressure pad and actuatable for moving the pressure pad away from the aperture plate; the improvement comprising means for detecting the presence of a strip of film in said film channel, said detecting means including a member mounted on said housing for movement between (1) a first position in which at least a portion of said member resiliently extends into the path of a strip of film in said channel, (2) a second position to which said member is moved by the strip of film and (3) a third position spaced from said path; and means operatively interconnecting said member and the pressure pad for moving said member to its third position upon actuation of said pressure pad moving means.

2. The improvement as defined in claim 1 wherein the pressure pad moving means comprises:

an actuator movably mounted on said housing; and means interconnecting said actuator and the pressure pad for (1) moving the pressure pad away from the aperture plate upon movement of said actuator in one direction and (2) moving the pressure pad toward the aperture plate upon movement of said actuator in an opposite direction.

3. The improvement as defined in claim 2 wherein said member moving means comprises means interconnecting said actuator and said member whereby movement of said actuator in said one direction effects movement of said member to its third position.

* * * * *